(12) United States Patent
Rushton et al.

(10) Patent No.: US 11,027,677 B2
(45) Date of Patent: Jun. 8, 2021

(54) CAMERA BASED ACTIVATION OF HEATED WIPERS AND WINDSHIELD DEFROST

(71) Applicant: GM GLOBAL TECHNOLOGY OPERATIONS LLC, Detroit, MI (US)

(72) Inventors: Gary Rushton, Warren, MI (US); Mohannad Murad, Troy, MI (US); Lynn Y. Lau, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 554 days.

(21) Appl. No.: 15/938,375

(22) Filed: Mar. 28, 2018

(65) Prior Publication Data

US 2019/0299886 A1    Oct. 3, 2019

(51) Int. Cl.
*B60R 16/023*     (2006.01)
*B60S 1/02*       (2006.01)
*B60S 1/04*       (2006.01)
*B60R 11/04*      (2006.01)
*G06T 7/70*       (2017.01)
*G06K 9/00*       (2006.01)
*F02N 11/08*      (2006.01)

(52) U.S. Cl.
CPC .......... *B60R 16/0237* (2013.01); *B60R 11/04* (2013.01); *B60S 1/023* (2013.01); *B60S 1/0477* (2013.01); *F02N 11/0807* (2013.01); *G06K 9/00791* (2013.01); *G06T 7/70* (2017.01); *G06T 2207/30252* (2013.01)

(58) Field of Classification Search
CPC ....... B60R 16/0237; B60R 11/04; G06T 7/70; G06T 2207/30252; B60S 1/023; B60S 1/0477; F02N 11/0807; G06K 9/00791; G07K 9/00791
USPC .......................................................... 701/36
See application file for complete search history.

(56) References Cited

U.S. PATENT DOCUMENTS

| | | | |
|---|---|---|---|
| 2005/0225175 A1* | 10/2005 | Maehara | B60W 10/06 307/10.1 |
| 2013/0140883 A1* | 6/2013 | Tawada | H02J 13/00016 307/9.1 |
| 2015/0189172 A1* | 7/2015 | Kim | H04N 21/23418 348/118 |
| 2017/0043747 A1* | 2/2017 | Salter | H05B 3/84 |
| 2017/0253201 A1* | 9/2017 | Maeshiro | G06K 9/00791 |
| 2019/0049262 A1* | 2/2019 | Grimm | G07C 5/008 |

* cited by examiner

*Primary Examiner* — Paula L Schneider

(57) ABSTRACT

A method to automatically activate at least one cold weather feature of a vehicle includes determining if the vehicle is in a state for activating at least one cold weather feature, and then determining at least one cold weather condition exists for activating at least one cold weather feature. When it is determined that at least one cold weather condition exists the at least one cold weather feature is automatically activated.

11 Claims, 5 Drawing Sheets

CAMERA BASED ACTIVATION OF HEATED WIPERS AND WINDSHIELD DEFROST

FIELD OF INVENTION

The subject disclosure relates to detection based systems and more particularly to camera based detection for activation of vehicle subsystems.

BACKGROUND

Vehicles (e.g., automobiles, AVs, trucks, farm equipment, construction equipment, etc.) are increasingly instrumented with sensors to facilitate augmented or automated operation of functions and features. Exemplary sensors include those that capture data about the weather around the vehicle and those that capture data about the vehicle. For example, cameras, audio detectors (e.g., microphones), and radar or lidar systems obtain data about the environment around the vehicle (e.g., other objects in the vicinity of the vehicle). As another example, outside air temperature sensors (OATS), in cabin temperature sensors (ICTS), over the air weather alerts and the like provide information about the vehicle's internal and external climate in which the vehicle operates.

SUMMARY

One or more exemplary embodiments address the above issue by providing a method to automatically activate at least one cold weather feature of a vehicle. The method in accordance with aspects of an exemplary embodiment include determining if the vehicle is in a state for activating at least one cold weather feature. Another aspect includes determining at least one cold weather condition exists for activating at least one cold weather feature by reading a front camera configured to view through the vehicle windshield. And another aspect includes automatically activating at least one cold weather feature when it is determined that at least one cold weather condition exists.

Another aspect in accordance with the exemplary embodiment wherein determining if the vehicle is in a state includes determining if the vehicle has been started remotely. Yet another aspect wherein determining if the vehicle is in a state further includes determining if the vehicle is being driven with windshield wipers on. And still another aspect wherein determining at least one cold weather condition exists includes reading an outside air temperature sensor or cold weather alerts received by the vehicle.

Still another aspect wherein determining at least one cold weather condition exists further includes activating the front camera configured to view through the vehicle windshield when the vehicle has been remotely started and at least one cold weather condition exists. And yet another aspect in accordance with the exemplary embodiment wherein determining at least one cold weather condition exists further includes reading the front camera configured to view through the vehicle windshield when the vehicle is being driven with the windshield wipers on and at least one cold weather condition exists.

A further aspect includes activating a defroster and a wiper deicer when the vehicle hood is not visible. And another aspect includes activating a wiper deicer when the vehicle wipers are not visible. And still another aspect includes estimating a time when the wipers are positioned in the field of view of the front camera when reading the front camera. Yet another aspect includes activating a wiper deicer when the vehicle wipers are at least partially disposed with ice or snow. And one other aspect includes activating a defroster and a wiper deicer when the vehicle windshield is at least partially disposed with ice or snow in a streaking pattern.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
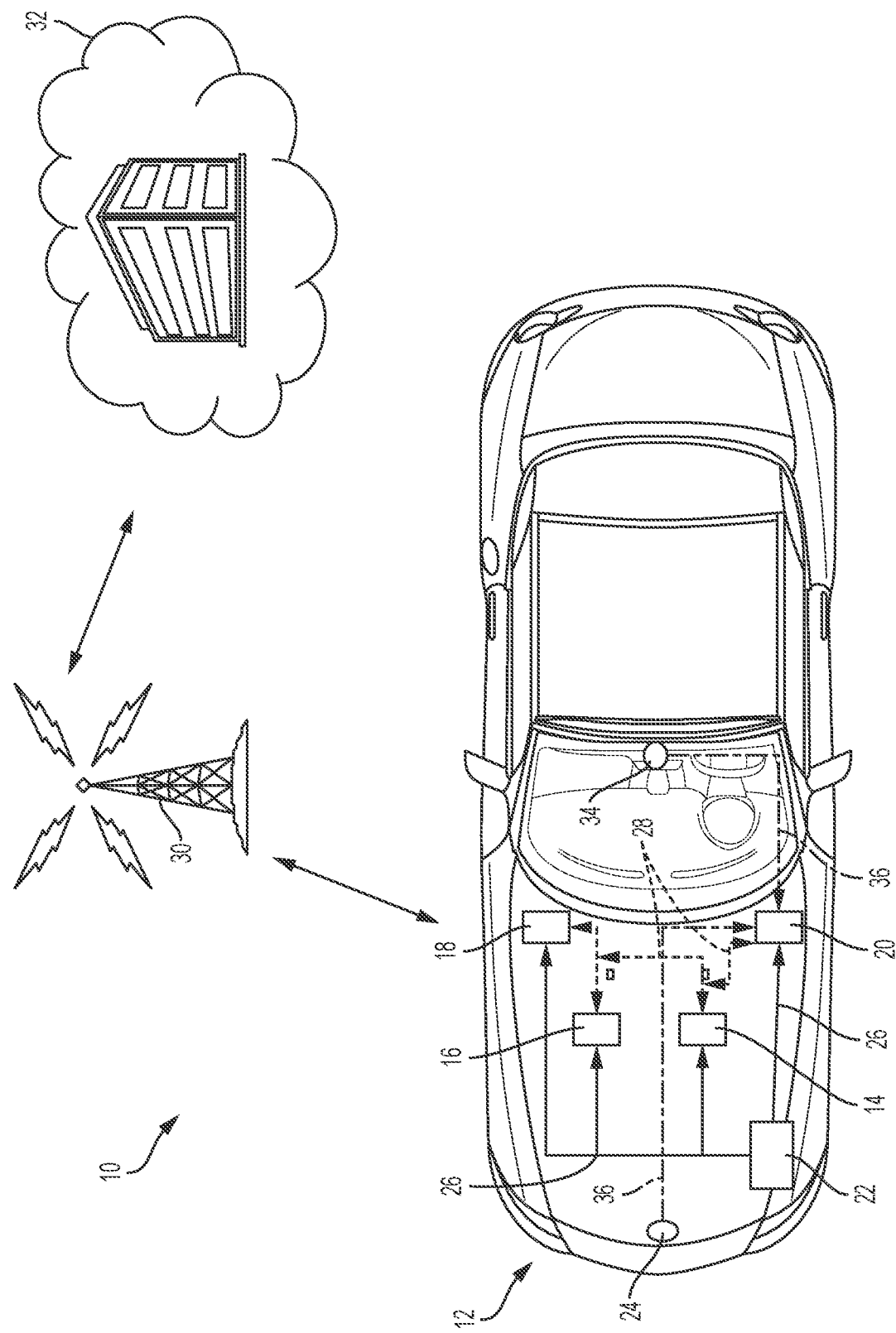
FIG. 1 illustrates a vehicle system configured for the disclosing the method to automatically activate at least one cold weather feature of a vehicle as according aspects of an exemplary embodiment.

Referring now to the drawings, wherein the showings are for the purpose of illustrating certain exemplary embodiments only, and not for the purpose of limiting the same, FIG. 1 graphically illustrates a vehicle system configured for the disclosing the method to automatically activate at least one cold weather feature of a vehicle.

The system 10 for a vehicle 12 having electronic control units (14, 16, 18, and 20) in electrical communication with a conventional 12-Volt battery 22 and at least one sensor, i.e., outside air temperature sensor (OATS) 24 and a front camera 34. In accordance with aspects of the exemplary embodiment, the OATS 24 is disposed proximate the front grille of the vehicle and the front camera 34 is disposed on the rear view mirror (not shown) with its lens facing the interior surface of the windshield such that the field of view of the front camera 34 spans the windshield. It is appreciated that other sensors, e.g., in-cabin temperature sensor, may be included on the vehicle 12 for use in accordance with aspects of the exemplary embodiment for automatically activating at least one cold weather feature of a vehicle such as heated steering wheel and/or heated seats.

The control units include a transmission control module (TCM) 14, an engine control module (ECM) 16, telematics module 18 and a body control module (BCM) 20.

The telematics module 18 is configured to manage exchange of information between the on-board controllers or for exchanging information with a location that is remote from the vehicle, e.g., remote office or server, that can be downloaded, such as by wireless over-the-air transmission. As such, vehicle data may be remotely stored, monitored, analyzed, and/or manipulated for diagnostic purposes. Also, important driving information can be sent to the vehicle that could be helpful to the operator such as traffic conditions and/or hazardous weather condition alerts.

In accordance with the preferred embodiment, the OATS 24 and the front camera 34 are also in communication with the BCM 20 which is configured for collecting and storing data received from these and various other sensors. Sensor data received by the BCM 20 can be for automatically controlling several vehicle functions and features including, but not limited to, power door locks, power seats, heated seats, HVAC defroster, and wiper deicers The battery 24 is also in electrical communication with the TCM 14, ECM 16, telematics module 18, and the BCM 20 through an assortment of electrical wires 26 for providing power to the control modules (14, 16, 18, and 20). It is appreciated that the vehicle system 10 may include additional control modules and additional sensors that cooperate to control and monitor the several functionalities of the vehicle that are not discussed herein but may be included in the vehicle system 10 without exceeding the scope of the exemplary embodiment.

The control units (14, 16, 18, and 20) are connected using one or more network connections, such as a communications network 28. The communications network allows the control modules (14, 16, 18, and 20) to send and receive data between on-board control units in addition to exchanging information with off-board locations. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. The OATS 24 and front camera 34 are in signal communication with the BCM 20 through conductors 36 suitable for transferring the respective sensed information to the BCM 20.

As discussed above, the telematics module 18 is operative to communicate wirelessly through at least one cellular network 30 with at least one remote location or object. For example, the telematics module 18 is capable of communicating with other similarly equipped vehicles, remote servers, mobile devices, and a remote office 32.

The wireless connection 30 allows for the vehicle 12 to receive information, e.g., cold weather alerts, over the air (OAT) from the remote office 32 in accordance with the exemplary embodiment. The remote office 32 can also send remote commands to one or more vehicle controllers for activating certain vehicle functions and features without operator involvement when deemed necessary.

The vehicle system 12 in accordance with the exemplary embodiment is configured to address the limitations of some vehicle defrost modes. Current windshield defrost systems depend only on the OATS. During a remote start, if the temperature is below 40 degrees then windshield defrost is automatically activated. The systems cannot distinguish between cases where the windshield is clear and cases where the windshield is covered with snow or ice. Wiper deicer systems are similarly automatically activated based on outside air temperature. Alternatively, the wiper deicers may be activated through a dedicated switch or in combination with front or rear defog/defrost systems. The exemplary method to automatically activate at least one cold weather feature on a vehicle is operative to overcome the limited strategies of current systems by activating at least one cold weather feature based on a fusion strategy that utilizes a camera and environmental sensing.

Figure 2B:
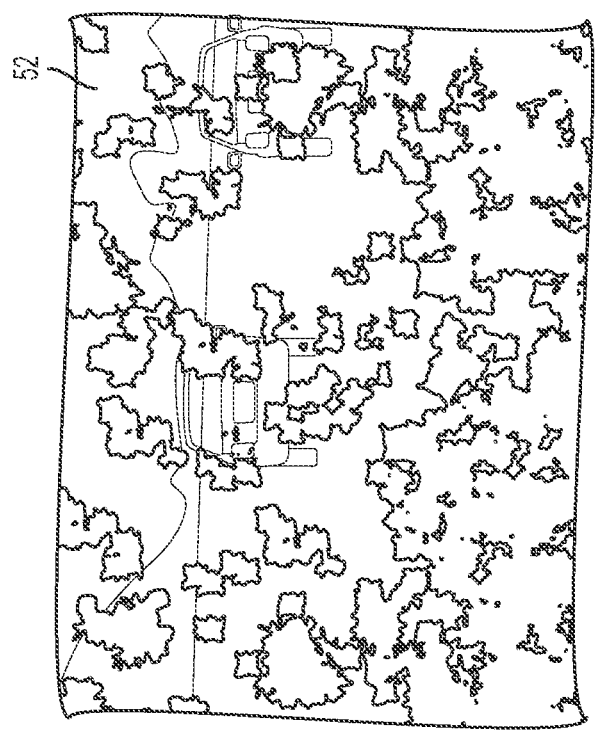
FIG. 2B illustrates a camera image of the view of a windshield covered with ice and snow.
Figure 2A:
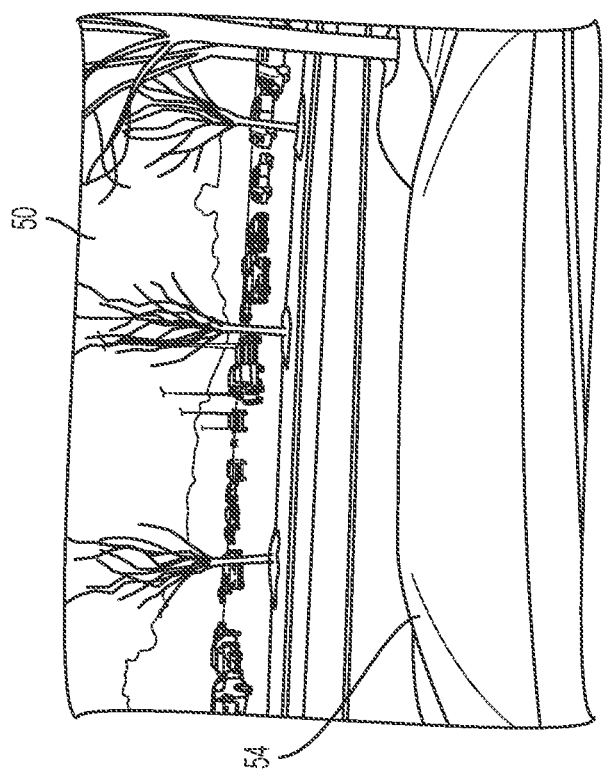
FIG. 2A illustrates a camera image of the view through a windshield not covered with ice and snow.

Referring to FIGS. 2A and 2B, images are provided that illustrate what the front camera 34 sees in its field of view 50 when the windshield is unobstructed from snow or ice, and what the front camera sees in its field of view 52 when the windshield is covered with snow and ice. In FIG. 2A, the surface and front edge of the vehicle hood 54 is clearly visible and free from snow and ice. If, for example, the outside air temperature was below 32° F. then, in accordance with aspects of the exemplary embodiment, the HVAC defrost or wiper deicer would not be activated. However, in FIG. 2B the front camera 34 sees the windshield is covered with snow and ice such that practically nothing is visible through the windshield. In this case, for example if the outside air temperature were below 32° F. then, in accordance with aspects of the exemplary embodiment, the HVAC defrost and the wiper deicer would be automatically activated. By fusing information from the OATS 24 and the front camera 34, a determination can be made whether it is necessary to automatically activate one or more cold weather features on the vehicle.

Figure 3B:
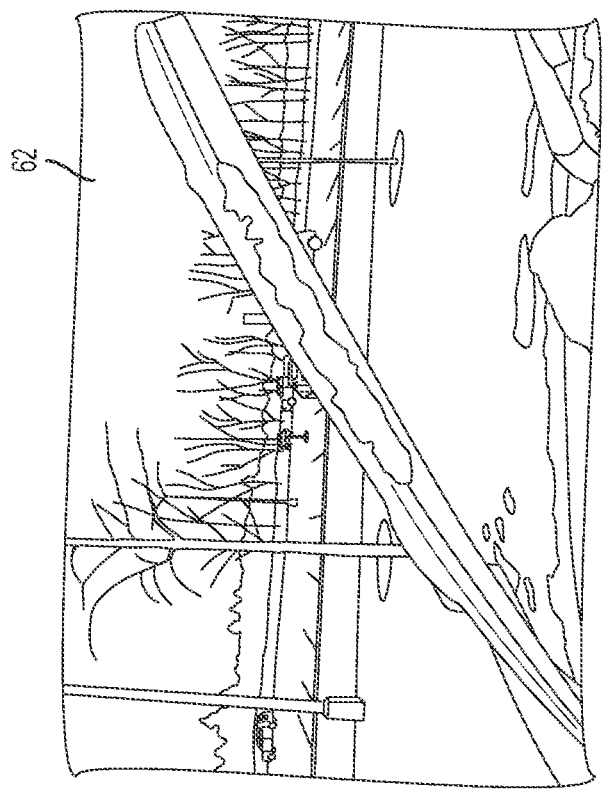
FIG. 3B illustrates a camera image of the view of a windshield wiper having irregular edges when being at least partially disposed with ice and snow.
Figure 3A:
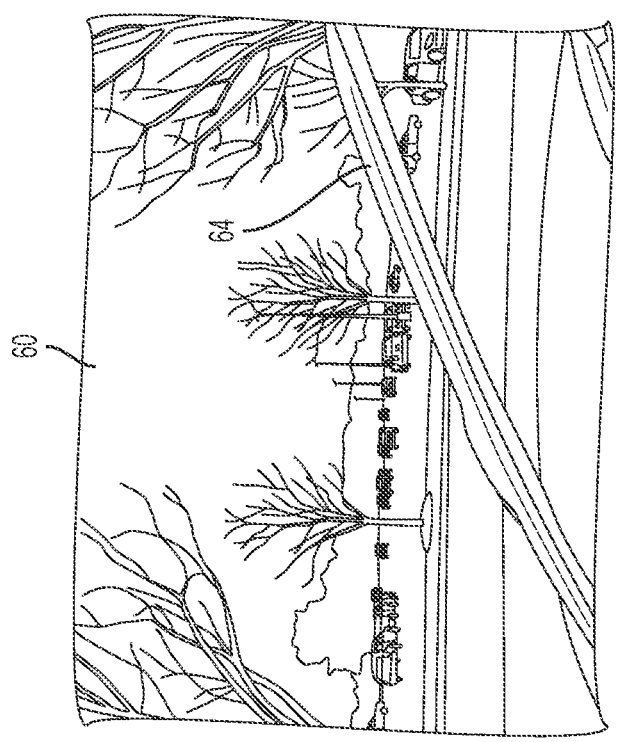
FIG. 3A illustrates a camera image of the view of a windshield wiper having straight edges when not disposed with ice and snow.

FIGS. 3A and 3B illustrates what the front camera 34 sees in its field of view where a windshield wiper 64 is free from snow and ice 60 and where a windshield wiper is at least partially disposed with snow and ice 62. In the case of the windshield wiper 64 being free from snow and ice, but with the air temperature being below 32° F., there would be no need to activate the wiper deicer in accordance with aspects of the exemplary embodiment. If the system only relied on the OATS 24 reading then the wiper deicer feature may have been automatically activated to create a wasteful load on the vehicle. However, in the case of the windshield wiper 64 being at least partially disposed with snow and ice the wiper deicer would be automatically activated due to the information from the OATS 24 and the front camera 34. In accordance with aspects of the exemplary embodiment the information from the front camera 34 serves as a rationality check against the information received from the OATS. As such, the at least one cold weather feature, i.e., the wiper deicer, is only automatically activated when information from both the OATS 24 and the front camera 34 indicate that a cold weather condition exists and at least one cold weather feature should be activated to address the condition.

Figure 4:
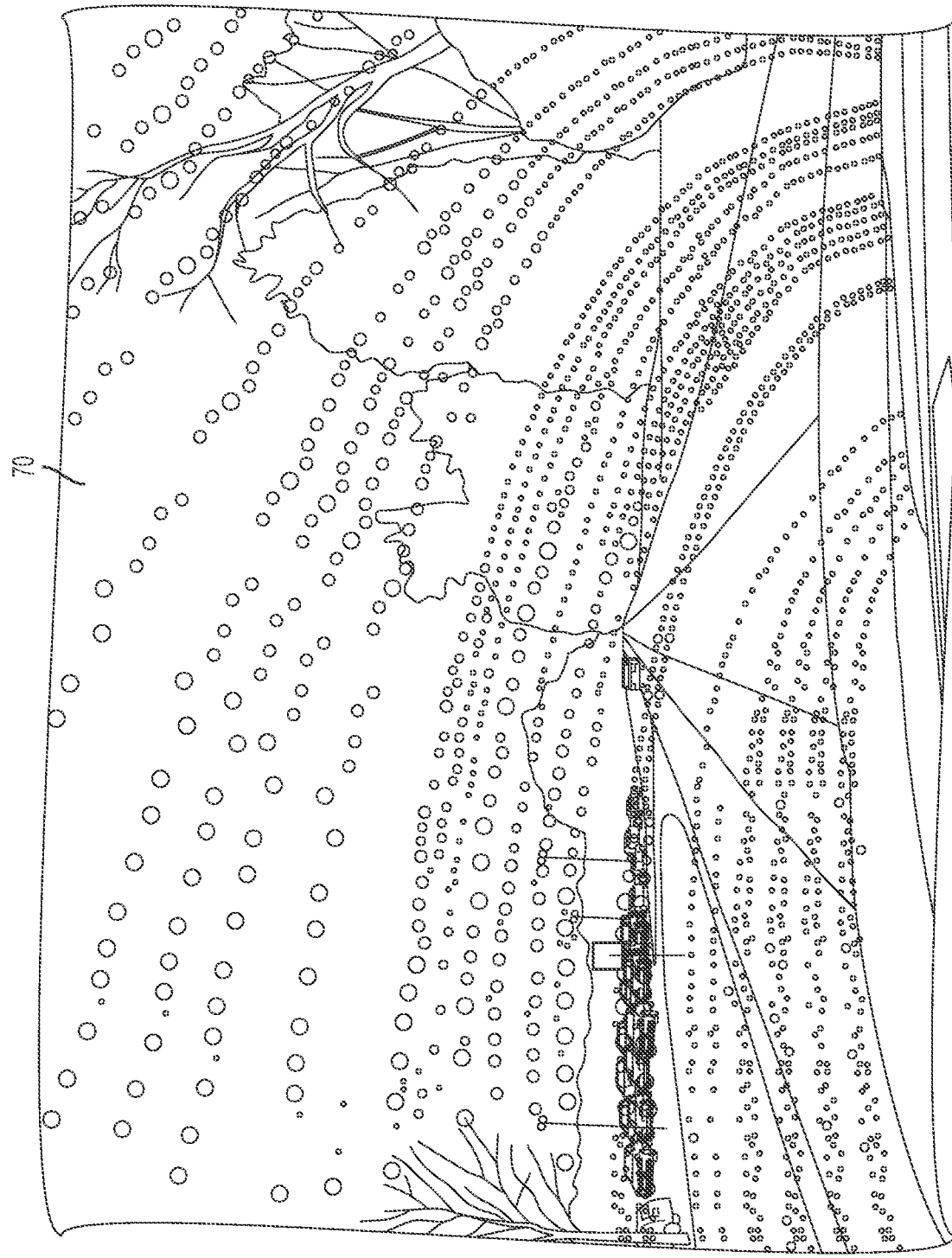
FIG. 4 illustrates a camera image of the view of a windshield covered with a streaking pattern that could indicate ice and/or snow is on the wiper blade.

FIG. 4 illustrates a front camera 34 image of the view 70 of vehicle windshield covered with a streaking pattern that could indicate ice and/or snow is on the vehicle windshield and/or the wiper blades. In such case, a system in accordance with the exemplary embodiment may be configured to activate both of the HVAC defroster and the wiper deicer or only the wiper deicer to address the cold weather condition.

Figure 5:
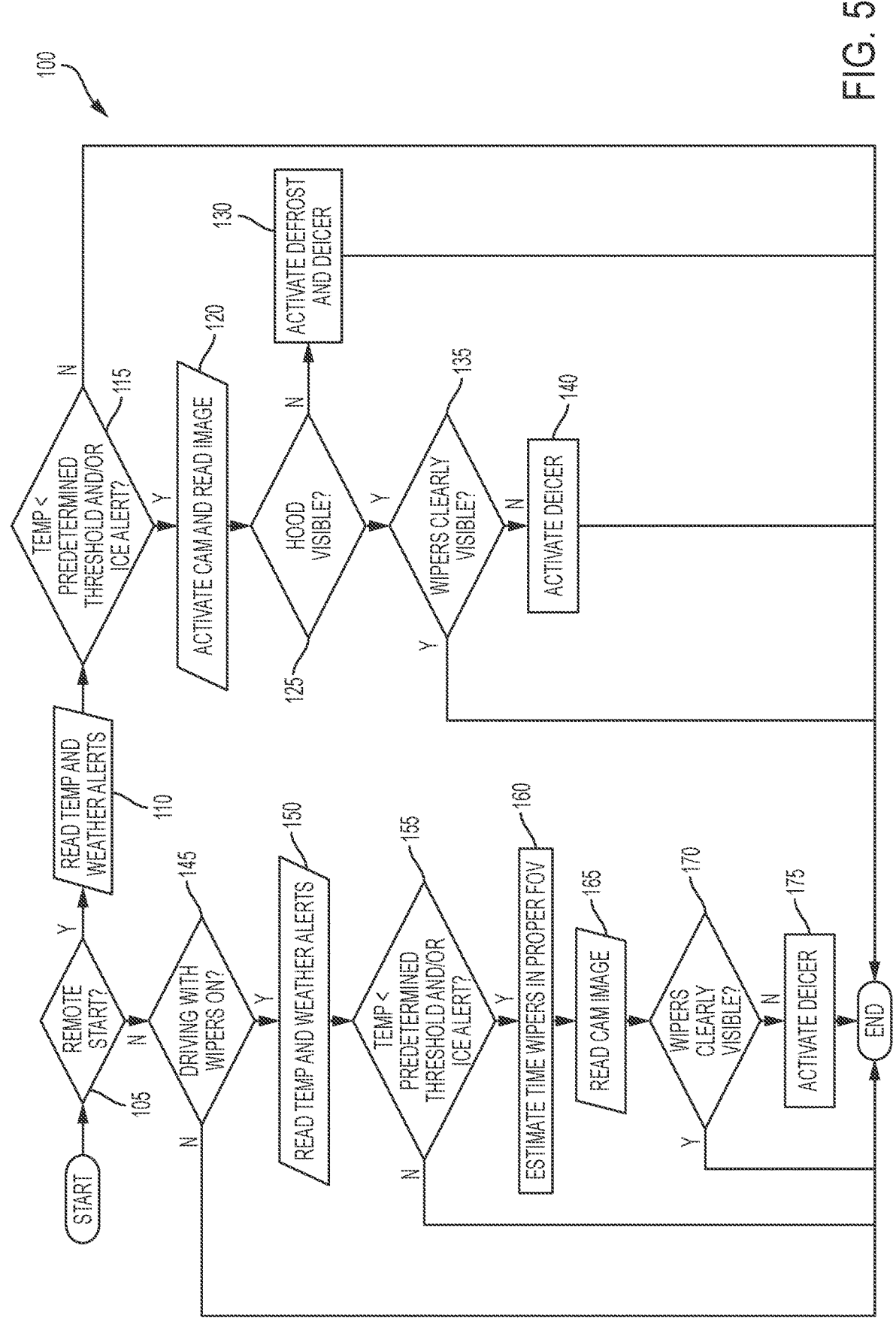
FIG. 5 is an algorithm for the method of automatically activating at least one cold weather feature of a vehicle in accordance with the exemplary embodiment.

Referring now to FIG. 5, an algorithm 100 for the method of automatically activating at least one cold weather feature of a vehicle in accordance with the exemplary embodiment is provided.

At block 105, the method begins with determining if the vehicle has been remotely started. If the vehicle has been remotely started then, at block 110, the method continues with reading the outside air temperature using the OATS, and reads cold weather alerts, if any, that were received by the vehicle telematics system from a remote location such as a national weather service center or broadcast from a local weather station.

Next, at block 115, the outside air temperature sensor (OATS) is checked to determine if it is less than a predetermined threshold, e.g., 32° F., and/or if any weather alerts received by the vehicle indicate snow and ice warnings are current. If the OATS or weather alerts don't indicate that a significant cold weather condition exists then the method ends. However, if the OATS or weather alert indicate a significant cold weather condition exists then, at block 120, the front camera is activated which operates to read the image in its field of view through the windshield. This image is processed and is used in combination with the OATS reading and weather alerts to further verify or refute that a significant cold weather condition exists.

At block 125, the front camera verifies or refutes that a significant cold weather condition exists by first determining if the vehicle hood is visible in its field of view through the windshield. If the vehicle hood is not visible then, at block 130, the vehicle system operates to automatically activate the HVAC defroster and the wiper deicer to remedy the issue and then the method ends.

If the vehicle hood is visible then, at block 135, the method continues with determining if the wipers are clearly visible or at least partially disposed with snow or ice. If the wipers are clearly visible then the method ends. However, if the wipers are at least partially disposed with snow and/or ice then, at block 140, the vehicle system automatically activates the wiper deicer to melt the snow and/or ice and then the method ends.

Returning to block 105, if the vehicle has not been remotely started then, at block 145, the method continues with determining if the vehicle is being driven with the windshield wipers on. If the vehicle is being driven without the windshield wipers on then the method ends. However if the vehicle is being driven with the windshield wipers on then, at block 150, the method continues with reading the outside air temperature using the OATS, and reads cold weather alerts, if any, that were received by the vehicle telematics system from a remote location such as a national weather service center or broadcast from a local weather station.

Next, at block 155, the outside air temperature sensor (OATS) is checked to determine if it is less than a predetermined threshold, e.g., 32° F., and/or if any weather alerts received by the vehicle indicate snow and ice warnings are current. If the OATS or weather alerts don't indicate that a significant cold weather condition exists then the method ends.

If the OATS or weather alerts indicate that a significant cold weather condition exists then, at block 160, an estimate is made of the time the windshield wipers are at a specific position in the field of view of the front camera. This helps with ensuring the straight edges of the wipers will be seen by the camera.

Next, at block 165, the front camera reads the image when the wipers are in a specific position within its field of view through the windshield. The image is processed and the images are used to verify or refute whether a cold weather condition exists.

At block 170, the method continues with determining if the windshield wipers are clearly visible or at least partially disposed with snow and/or ice. If the straight edges of the windshield wipers are clearly visible then this would indicate that no snow or ice is present and the method ends. If the windshield wipers are at least partially disposed with snow and/or ice then, at block 175, the vehicle system automatically activates the wiper deicer to remedy the issue and then the method ends.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method to automatically activate at least one cold weather feature of a vehicle, the method comprising:
   determining if the vehicle is in a state for activating at least one cold weather feature by determining if the vehicle has been remotely started;
   activating a front camera configured to view through a vehicle windshield when the vehicle has been remotely started;
   determining at least one cold weather condition exists for activating at least one cold weather feature by reading the front camera configured to view through the vehicle windshield; and
   automatically activating at least one cold weather feature when it is determined that at least one cold weather condition exists, wherein automatically activating the at least one cold weather feature includes activating a wiper deicer when vehicle wipers are not visible by the front camera.

2. The method of claim 1 wherein determining if the vehicle is in the state for activating further comprises determining if the vehicle is being driven with the vehicle wipers on.

3. The method of claim 1 wherein determining at least one cold weather condition exists further comprises reading an outside air temperature sensor or cold weather alerts received by the vehicle.

4. The method of claim 1 further comprising activating a defroster when a vehicle hood is not visible in a field of view of the front camera.

5. The method of claim 1 further comprising estimating a time when the vehicle wipers are positioned in a field of view of the front camera when reading the front camera.

6. The method of claim 1 further comprising activating a defroster when the vehicle windshield is at least partially disposed with ice or snow in a streaking pattern.

7. A method to automatically activate at least one cold weather feature of a vehicle, the method comprising:
   determining if the vehicle is in a state for activating at least one cold weather feature including determining if the vehicle is being driven with windshield wipers on;
   determining at least one cold weather condition exists for activating at least one cold weather feature by:
      reading a front camera configured to view through a vehicle windshield when the vehicle is being driven with the windshield wipers on;
      estimating a time when the windshield wipers are positioned in a field of view of the front camera;
      reading an image from the front camera at the estimated time;
      verifying a cold weather condition from the image;
      reading an outside air temperature sensor or cold weather alerts received by the vehicle from a remote location; and
      determining the outside air temperature is below a threshold value or receipt of the cold weather alerts; and
   automatically activating at least one cold weather feature when it is determined that at least one cold weather condition exists.

8. The method of claim 7 wherein determining if the vehicle is in the state for activating further comprises determining if the vehicle has been started remotely.

9. The method of claim 7 further comprising activating a defroster and a wiper deicer when a vehicle hood is not visible in a field of view of the front camera.

10. The method of claim 7 further comprising activating a wiper deicer when the windshield wipers are at least partially not visible in a field of view of the front camera.

11. The method of claim 7 further comprising activating a defroster and a wiper deicer when the vehicle windshield is at least partially disposed with ice or snow in a streaking pattern.

\* \* \* \* \*